United States Patent
Sobel et al.

(10) Patent No.: US 7,577,994 B1
(45) Date of Patent: Aug. 18, 2009

(54) DETECTING LOCAL GRAPHIC PASSWORD DECIPHERING ATTACKS

(75) Inventors: William E. Sobel, Stevenson Ranch, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 736 days.

(21) Appl. No.: 11/213,187

(22) Filed: Aug. 25, 2005

(51) Int. Cl.
*G06F 17/30* (2006.01)
*G06F 15/173* (2006.01)

(52) U.S. Cl. .............. 726/22; 726/2; 726/21; 726/25; 713/168; 713/170; 713/184; 709/225

(58) Field of Classification Search .............. 726/22
See application file for complete search history.

(56) References Cited

U.S. PATENT DOCUMENTS

| | | | |
|---|---|---|---|
| 6,332,192 B1 * | 12/2001 | Boroditsky et al. | 713/168 |
| 7,149,899 B2 * | 12/2006 | Pinkas et al. | 713/182 |
| 7,200,576 B2 * | 4/2007 | Steeves et al. | 705/64 |
| 7,219,148 B2 * | 5/2007 | Rounthwaite et al. | 709/224 |
| 7,219,368 B2 * | 5/2007 | Juels et al. | 726/2 |
| 7,383,570 B2 * | 6/2008 | Pinkas et al. | 726/2 |
| 2004/0059951 A1 * | 3/2004 | Pinkas et al. | 713/202 |
| 2005/0193208 A1 * | 9/2005 | Charrette et al. | 713/182 |
| 2005/0228770 A1 * | 10/2005 | Willamson et al. | 707/1 |
| 2007/0250920 A1 * | 10/2007 | Lindsay | 726/7 |

OTHER PUBLICATIONS

Li, Shujun, et al, 'Secure Human-Computer Identification (Interface) Systems against Peeping Attacks: SecHCI', Cryptology ePrint Archive, Report 2005/268, 2005, entire document, http://eprint.iacr.org/2005/268.pdf.*

"Alchemedia Delivers Clever Content Online Image Protection to Macintosh Clients", News Release, PR Newswire Europe Limited [online] Mar. 20, 2000 [Retrieved on Aug. 2, 2005] Retrieved from the Internet: <URL: http://www.prnewswire.dk/cgi/news/release?id=18263>. 1 page.

Mori, Greg et al., "Breaking a Visual CAPTCHA", UC Berkeley Computer Vision Group [online] Dec. 15, 2003 [Retrieved on Apr. 25, 2005] Retrieved from the Internet: <URL: http://www.cs.berkeley.edu/~mori/gimpy/gimpy.html>. 4 pages.

"Telling Humans and Computers Apart (Automatically)", The CAPTCHA Project, Carnegie Mellon University [online] [Retrieved on Apr. 25, 2005] Retrieved from the Internet: <URL: http://www.captcha.net/>. 2 pages.

* cited by examiner

*Primary Examiner*—Kambiz Zand
*Assistant Examiner*—Ronald Baum
(74) *Attorney, Agent, or Firm*—Fenwick & West LLP

(57) ABSTRACT

A mechanism for using a graphic password test while providing the ability for detecting attempts by programs to decipher the password for malicious attack is disclosed. An access module provides a prompt to an entity attempting to access a protected resource. An image-substitution module provides a first or second graphic image to the entity (images display a first and second password, respectively). A programmatic interface that provides access to an image displayed on a computer screen can be modified to periodically provide a second image to a computer program that is different from the first image displayed to a human user. A receiving module receives a password in response to the prompt and a determination module determines if the password is first or second password. When the second password is received, it is likely a malware attempt at bypassing the graphic password test. An analysis module responds e.g., by collecting information about the entity that attempted access.

20 Claims, 5 Drawing Sheets

DETECTING LOCAL GRAPHIC PASSWORD DECIPHERING ATTACKS

BACKGROUND OF THE INVENTION

1. Field of the Invention

This invention pertains in general to computer security, and more specifically to techniques for detecting graphic password deciphering attacks on computers.

2. Description of the Related Art

Computer systems are continually threatened by a risk of attack from malicious software or "malware" that is designed to destroy or harm other software or networks. As used herein, "malicious software" or "malware" is any software developed for the purpose of doing harm to a computer system, including "malicious code" (e.g., viruses, worms, and Trojan horses) or any code that enters a computer without an authorized user's knowledge and/or without an authorized user's consent. A "malicious attack" is any attack on or harm caused to a computer system by malicious software or any attempt to access restricted information (e.g., stealing valuable information, such as password-protected information, credit card numbers, etc).

Malicious software can harm a computer in a number of manners, and in some cases the malicious software causes harm by mimicking the actions of a human. For example, malicious software can target different types of web services, such as those that can be enabled through a web form that a human would typically fill out to gain access to the service. For example, companies offering free e-mail services (e.g., Yahoo® and Hotmail®) that can be signed up for and enabled simply through web forms are one target for malware attacks. Specifically, malicious entities that wish to establish anonymous and numerous e-mail accounts (e.g., perpetrators of e-mail fraud or companies sending masses of junk mail or spam) can deploy automated computer programs (e.g., bots) to create thousands of new e-mail accounts by filling out the web forms.

To manage this type of threat of attack, computer programs and services have attempted to establish techniques for distinguishing human interaction from computer programmatic interaction. One example includes presenting a graphic image of a word or other sequence of characters on a slightly noisy background (e.g., a cluttered or textured background), and then asking the user to type the displayed word or character sequence into a field. In some cases, the image has been distorted or modified in some manner. This technique is commonly referred to as "Completely Automated Public Turing Test to Tell Computers and Humans Apart" or "CAPTCHA." This test applies the principle that it is programmatically difficult to sufficiently recognize the graphically displayed character sequence such that it can be programmatically entered into the corresponding field. In other words, this word or sequence of characters on a noisy background is presented to the user attempting to register for an e-mail account or other service, and the user is requested to read the word/character sequence and type it into a field before the web form can be successfully completed. Malware that automatically registers itself for numerous e-mail accounts has not in the past been able to easily recognize and enter the word or character sequence, thus making it difficult or impossible for the malware to complete the web form to sign up for an e-mail account.

Recently, however, there have been attempts to programmatically overcome the current CAPTCHA tests (e.g., there have been attempts at programmatically breaking the currently deployed CAPTCHA test at Yahoo®). These types of methods use standard techniques applied for solving object recognition problems. In other words, these methods include using techniques for comparing images of objects and for finding and tracking people in a video sequence. Finding the words or character sequences on the noisy background in a CAPTCHA test is equated with finding faces and body parts in an image and relating them to a human body (since images of people and objects are also often on noisy backgrounds). As these new methods for overcoming CAPTCHA tests become more readily available to attackers, the use of graphic password display as an assurance to the underlying software that it is interacting with a human user rather than another computer may no longer be as reliable.

Software security systems are also potential victims of attack by malware attempting to modify the security settings for a computer. Unless a user enables password protection on a security software settings invocation, software settings are currently vulnerable to programmatic malware attempts to change (e.g. disable) important security settings for a computer. However, in some cases, the default for the security software settings is not to require password protection on these important configuration settings. Standard password protection can introduce extra hassles for users and support issues for software providers. These reasons largely justify the decision of some software vendors and users to set the default for the password protection requirement setting so that password entry is not required. One solution for avoiding the hassles with enabling password protection is to employ a CAPTCHA test, including a graphic password prompt, as described above. However, while standard CAPTCHA tests can be used as a means to fend off these attacks, the current methods for circumventing these CAPTCHA tests make this a less viable option. Thus, software programs are still vulnerable to local graphic password deciphering attacks if password protection is not enabled since the standard CAPTCHA test no longer offers a reliable mechanism for distinguishing human interaction from computer programmatic interaction.

Therefore, there is a need in the art for a mechanism for effectively using a graphic password test (e.g., a CAPTCHA test) while still providing the ability for detecting attempts by computer programs to decipher the password for a malicious attack. It would also be useful for security information purposes to have a technique that allows detection of different types of graphic password deciphering attacks (without necessarily completely blocking these attacks) to get samples and gather information about the various attack techniques (e.g., to obtain early warning of different types of attacks that may occur).

DISCLOSURE OF INVENTION

The above need is met by a system and method for detecting a password deciphering attack. An access module provides a prompt to an entity attempting to access a protected resource. The prompt is adapted to enable providing of access to the protected resource upon receiving entry of a first password displayed in a first graphic image. An image-substitution module provides a graphic image to the entity attempting to respond to the prompt. The graphic image comprises either the first graphic image or a second graphic image that displays a second password. A receiving module receives a password in response to the prompt. A determination module then determines whether the password received by the receiving module comprises the first password or the second password (or something other than the first or second password, such as a mistyped password). Finally, an analysis module responds based on the results of the determination (e.g., by collecting information about the entity attempting to access the protected resource or by preventing the entity from accessing the protected resource). In some embodiments, the image-substitution module can periodically cause a human user to see a first image for a graphic prompt, while a computer program attempting to intercept and monitor that first image actually receives a second, different image through the interface used by the program. Thus, if the determination module determines that the second password shown in the second image is received, the entity is likely to be a computer program attempting a graphic password deciphering attack, rather than a human user. In this manner, a graphic password deciphering attack can be detected and information can be collected about the attacker, the attack methods used, etc.

In some embodiments, one or more computer programs attempt to respond to the prompt by obtaining information about the prompt through an interface (e.g., a programmatic access API) and the second graphic image is provided to some of the one or more computer programs through this interface. In some embodiments, the second image is provided through a different access interface than the first image. Which image is provided can be determined in a substantially random manner or according to a formula or set criteria. In some embodiments, the image-substitution module provides the graphic image by modifying or hooking an interface through which the graphic image is accessed to replace the first graphic image with the second graphic image for display to the entity. As described above, the first and second graphic images display first and second passwords, respectively. For example, the first and second graphic images can display a sequence of characters shown on noisy background and/or distorted sequence of characters (e.g., a CAPTCHA test). The first password displayed in the first graphic image can be substantially different from the second password displayed by the second graphic image.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
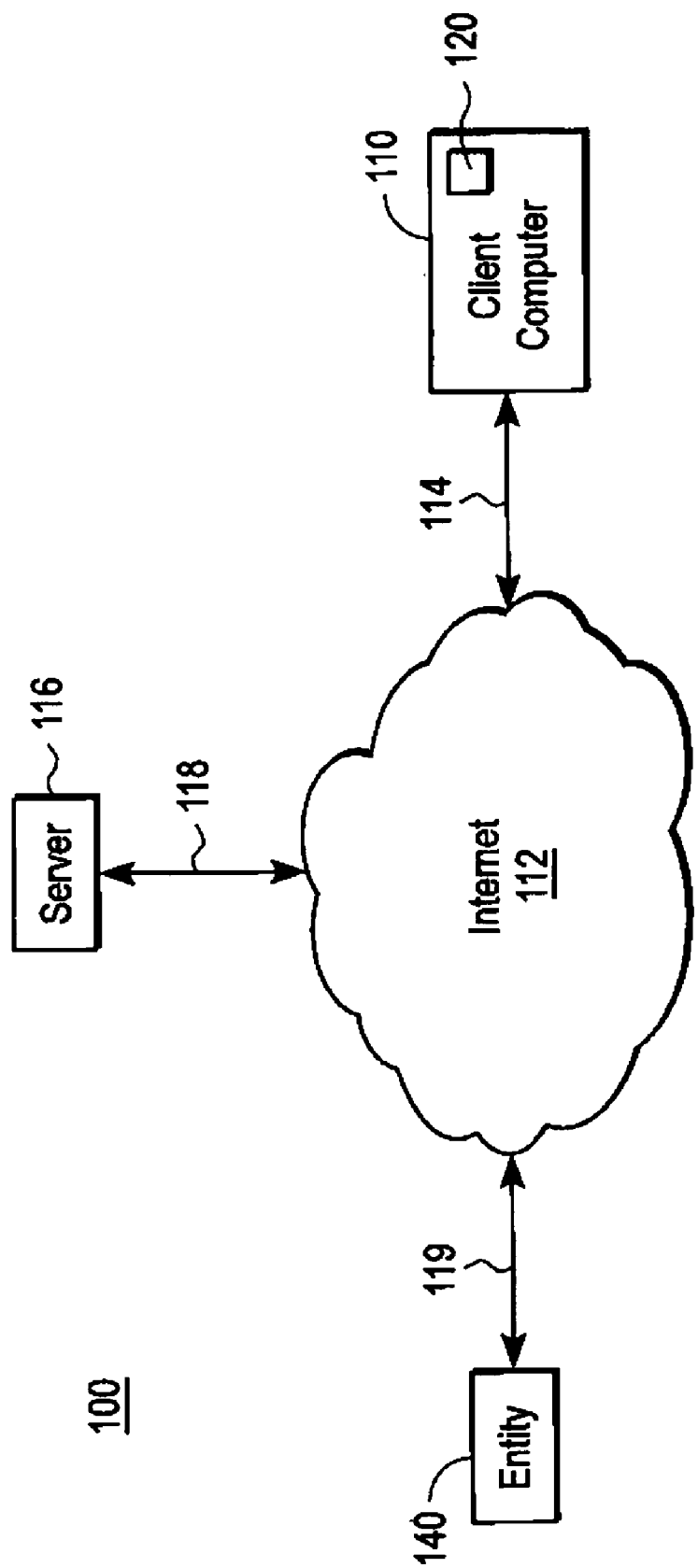
FIG. 1 is a high-level block diagram illustrating an example of a computing environment 100, according to one embodiment of the present invention.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

An image control module provides a mechanism for effectively using a CAPTCHA or other type of graphic password test or Turing test while still providing the ability to detect attempts by computer programs to decipher the password for a malicious attack. Since techniques are now being developed for overcoming graphic password prompt tests, there is a need for graphic password tests to evolve, as well. The image control module can periodically cause a human user to see a first image for a graphic password prompt, while a computer program attempting to intercept and monitor that first image actually receives a second, different image through the interface used by the program. The image control module described herein can hook and/or modify the programmatic interface (e.g. GDI32 BitBlt( ), GetPixel( ), and other APIs for video capture) that normally gives a computer program access to an image displayed on a computer screen. The interface can instead receive an image that is under control of the image control module, and the image received by the interface can be different from the image displayed on the computer screen to a human user. The computer program then responds to the password prompt by entering the password displayed on the second image rather than the password displayed on the first image that a human user would see. When there is a mismatch between what a user would see and type in (the correct character sequence displayed in the first image) and what a program would "see" and type in (the incorrect character sequence displayed on the second image), it is then possible to detect a malware attempt at bypassing the graphic password test. If the password displayed in the second image is entered in response to the password prompt, it is likely being entered by a computer program for potential attack, rather than a human user.

In some embodiments, the mismatch between the physical display image (e.g., first image) and the programmatically intercepted image (e.g., second image) is planned to occur only once in a while (e.g., the second image will only be displayed periodically). One reason for such a periodic display is to avoid letting attackers become too easily and quickly aware of and familiar with this technique of detecting attack. By only periodically using this method of detection, it is possible to acquire samples and early warning of various attacks that may be occurring or about to occur, and this information can be used in prevention of future attacks. Thus, in this embodiment, the image control module provides a method for monitoring for possible attacks and gathering information about the type of attack, the attacker, etc., rather than completely preventing the attack (however, the technique can be used for prevention, as well).

As used herein, the term "entity" can include human users, computer programs, bots, etc. The term "prompt" or "password prompt" can include any type of prompt for entry of any type of password, and the password to be entered can be provided or displayed in a graphic image in some manner. The term "password" can include any type of password of any length, including any of numbers, letters, symbols, white space, letters in different cases (e.g., uppercase or lowercase), any combination of these, and other types of characters. The term "noisy background" can include a background associated with a graphic image in which a password is displayed, and the background can include any type of pattern, texture, clutter, design, any combination of these, or distortion of the image and/or background, or another type of formatting that is other than a plain, white background. A "sequence of characters" can include words, phrases, one or more letters, one or more numbers, one or more symbols, white space, and other types of characters or any combination of these. A "protected resource" includes anything to which access is restricted in some manner or which is password-protected or otherwise restricted from general, public use, including files, security settings or other types of personal settings or preferences, programs, directories, e-mail accounts, websites, etc. A "protected resource" can also include a resource that is restricted to exclude access by some types of entities, but not all entities (e.g., that allows human access, but not software access).

FIG. 1 is a high-level block diagram illustrating a computing environment 100 according to an embodiment of the present invention. One or more client computers 110 are in communication with the Internet 112 or other network, such as a local area network, wide area network, etc. via communications links 114. Although only one client computer 110 is shown in FIG. 1, there can be thousands or even millions of computer systems coupled to the Internet 112, according to embodiments of the present invention. In one embodiment, the client computer 110 is a conventional computer system. In other embodiments, one or more of the client computers 110 are different electronic devices having connectivity to remote update sources, such as cellular telephones, personal digital assistants (PDAs), etc. A server 116 is also connected to the Internet 112 via a communications link 118. In addition, an entity 140 is connected to the Internet 112 via a communications link 119. The entity 140 can be another client computer similar to client 110. In some embodiments, the entity 140 is a human user using a computer (e.g., a human user types information into a keyboard and controls a mouse associated with a computer). In some embodiments, the computer being used by the human user is actually the client 110. In this embodiment, the Internet 112 may not be present and the user may be directly typing password information or other information into a keyboard associated with client 110. In some embodiments, the entity 140 includes a computer program accessing the Internet 112 through link 119 and controlling keyboard events and other actions associated with a computer. However, in some embodiments, the computer program does not have to access the client 110 through the Internet 112, but instead can access the client 110 more directly (e.g., through some other type of link or the program might actually be installed on client 110).

As is known in the art, the client computer 110 preferably executes an operating system and one or more application programs. The operating system controls the operation of the computer system, and some examples of such an operating system include LINUX® or one of the versions of MICROSOFT WINDOWS®.

In FIG. 1, each client computer 110 is connected to the Internet via a communications link 114. Preferably, the communications link 114 utilizes conventional networking technology. Similarly, communications link 119 connecting the entity 140 to the Internet 112 can also utilize conventional networking technology. For example, in one embodiment a client computer 110 and/or entity 140 use a modem to connect over standard telephone lines with an Internet Service Provider (ISP) having a high-speed connection to the Internet 112. In another embodiment, a client computer 110 and/or entity 140 use a digital subscriber line (DSL) or cable modem to access the ISP via a telephone line or cable television line, respectively. In yet another embodiment, the client computer 110 and/or entity 140 use a network card and Ethernet connection to directly connect to the Internet 112. In still other embodiments, the communications link 114/communications link 119 connects the client computer 110/entity 140 via a wireless 802.11, Bluetooth, or mobile phone (e.g., CDMA or GSM) network, satellite downlink, uplink, or bi-directional link, etc. Thus, many different types of technology can be used to provide the functionality of the communications link 114 or 119.

As known in the art, the Internet 112 is a large, publicly-accessible network of networks. Individual computers and other devices can utilize communications protocols such as the transmission control protocol/Internet protocol (TCP/IP) to send messages to other computers on the Internet. These messages can use protocols such as the hypertext transport protocol (HTTP), file transfer protocol (FTP), simple mail transport protocol (SMTP), post office protocol 3 (POP3), and Internet message access protocol (IMAP), and data representations such as the hypertext markup language (HTML) and extensible markup language (XML) to carry and exchange information. Embodiments of the present invention may use other communications protocols and languages to exchange data.

Another communications link 118 connects the server 116 to the Internet 112. The server 116 can send information, such as one or more images to the client computer 110 and/or entity. Additionally, the client computer 110 and/or entity 140 can send out information or make requests (e.g., requests for an image through a programmatic interface, etc.) across the Internet 112 to the server 116. The communications link 118 is generally the same as the communications links 114 connecting the client computers 110 to the Internet 112. Although only one server 116 and associated communications link 118 are shown in FIG. 1, embodiments of the present invention may have multiple servers and/or links. The server 116 may be a conventional computer system or a network of systems.

In the embodiment illustrated in FIG. 1, each client computer 110 executes an image control module 120 for controlling which images are displayed with a password prompt and for detecting local graphic password deciphering attacks. The image control module 120 can be a discrete application program, or the module 120 can be integrated into another application program or the client computer's 110 operating system. In some embodiments, all or a portion of the image control module 120 is executed on the server 116. Thus, the server 116 can control what image is displayed to an entity 140 (e.g., the server 116 can substitute a different image for some entities 140 attempting to respond to a password prompt). In some embodiments, a password prompt is provided to an entity 140 attempting to access a protected resource or restricted information on client 110. For example, the entity 140 might be trying to access security software settings to modify or disable the settings on a computer 110, and thus the entity 140 might be trying to respond to the password prompt by filling out the appropriate fields. In another example, the entity 140 might be trying to fill out a web form to sign up for an e-mail service or other type of service on the web. In some embodiments, the entity 140 is a human user trying to access a protected resource on or using client computer 110. In other embodiments, the entity 140 is a computer program or bot trying to access a protected resource on computer 110. The entity 140 may or may not be accessing the computer through the Internet 112. The entity 140 might also be accessing information provided by server 116 or trying access to locally stored information on client computer 110. As one example, the entity 140 may be trying to access the computer's 110 own security software settings to modify or review the settings. Where the entity 140 is a computer program, the program may be running on a computer similar in design to client computer 110 or may be running on the client 110, itself.

As described above, the Internet 112 and/or the server 116 may or may not be present in these and in any other embodiments. For example, the malware and the program under attack by the malware can both reside on the same computer with interactions between the malware and the attackee not using the Internet 112 to communicate with each other. Other modifications can be made to accommodate any of the other numerous embodiments of the image control module 120 for detecting password-deciphering attacks.

Figure 2:
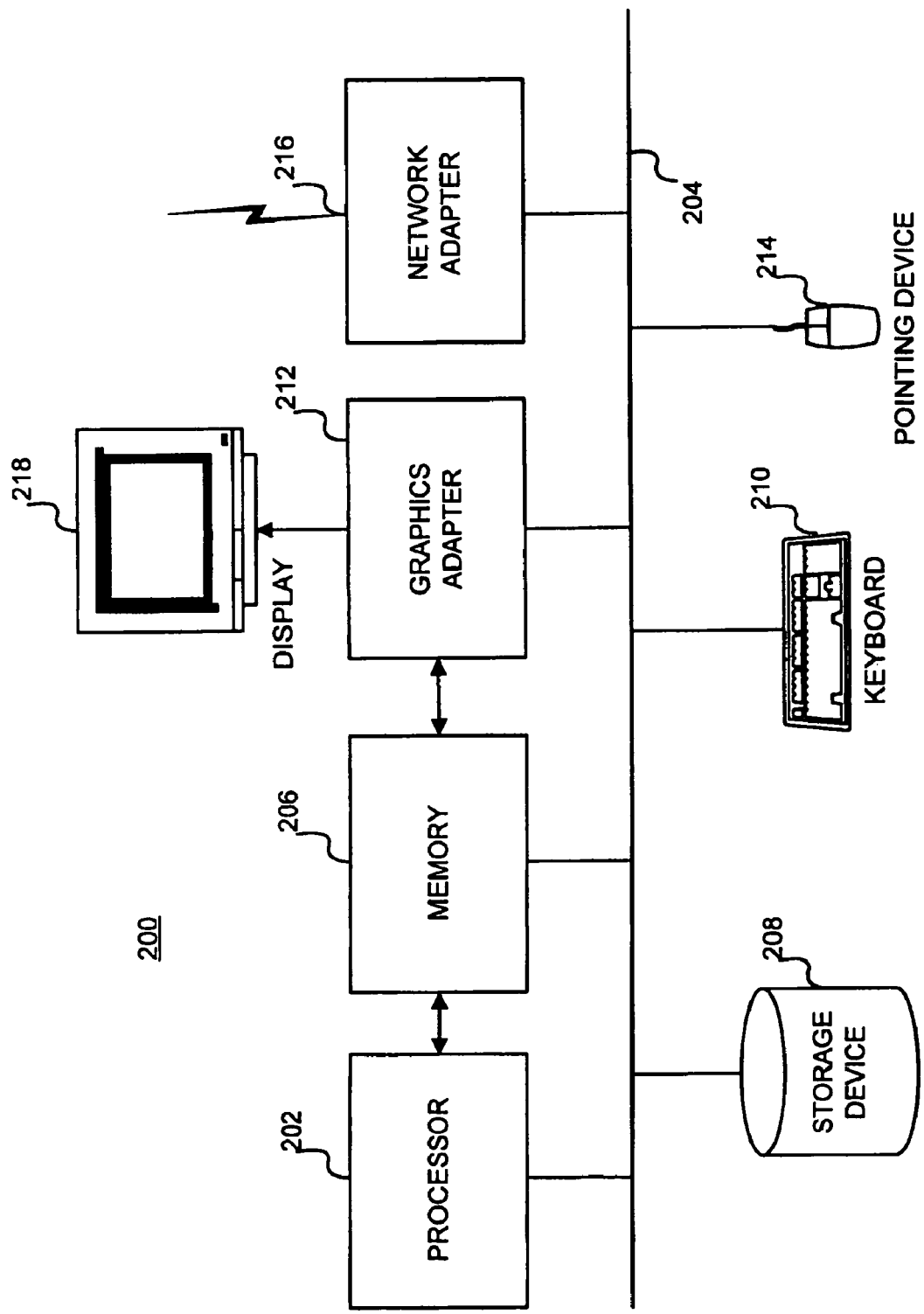
FIG. 2 is a high-level block diagram illustrating a standard computer system 200 for use with the present invention.

FIG. 2 is a high-level block diagram illustrating a functional view of a typical computer system 200 for storing and executing the information control module 120, according to one embodiment of the present invention. This computer system 200 can act as a client computer 110, as shown in FIG. 1. However, one or more of the components of the computer system 200 may be missing or modified in the client computer 110. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU, or the processor 202 may also be a custom-built processor. The memory 206 may be, for example, firmware, read-only memory (ROM), non-volatile random access memory (NVRAM), and/or RAM, and holds instructions and data used by the processor 202. The storage device 208 is, in one embodiment, a hard disk drive but can also be any other device capable of storing data, such as a writeable compact disk (CD) or DVD, and/or a solid-state memory device. The pointing device 214 may be a mouse, track ball, or other type of pointing device, and is used in combination with the keyboard 210 to input data into the computer system 200. The graphics adapter 212 displays images and other information on the display 218. The network adapter 216 couples the client computer 110 with the Internet 112.

As is known in the art, the computer system 200 is adapted to execute computer program modules for providing functionality described herein. In this description, the term "module" refers to computer program logic for providing the specified functionality. A module can be implemented in hardware, firmware, and/or software. Where the any of the modules described herein are implemented as software, the module can be implemented as a standalone program, but can also be implemented in other ways, for example as part of a larger program, as a plurality of separate programs, or as one or more statically or dynamically linked libraries. It will be understood that the modules described herein represent one embodiment of the present invention. Certain embodiments may include other modules. In addition, the embodiments may lack modules described herein and/or distribute the described functionality among the modules in a different manner. Additionally, the functionalities attributed to more than one module can be incorporated into a single module. In one embodiment of the present invention, the modules are stored on the storage device 208, loaded into the memory 206, and executed by the processor 202. Alternatively, hardware or software modules may be stored elsewhere within the computer system 200.

Figure 3:
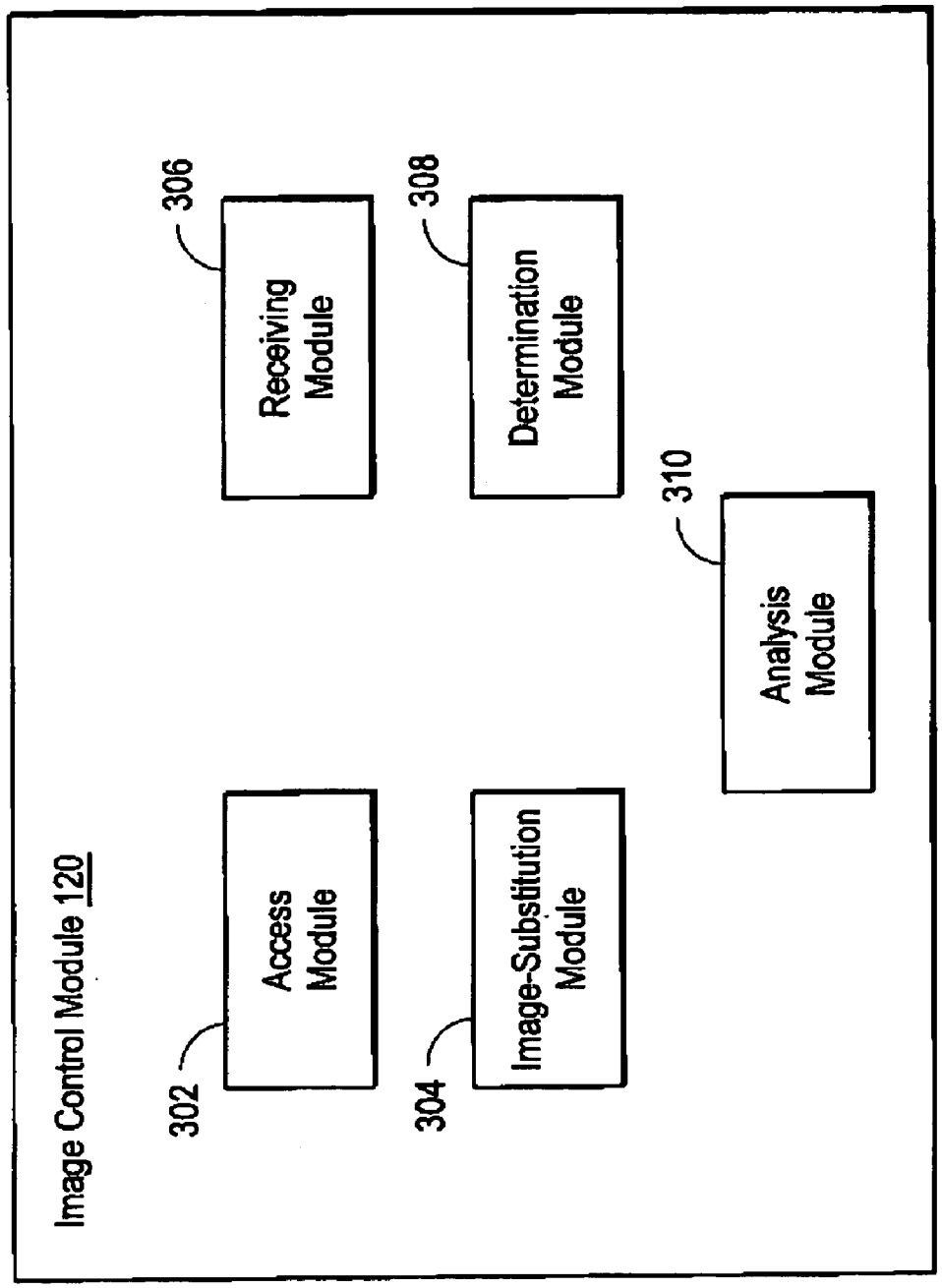
FIG. 3 is a high-level block diagram illustrating the functional modules within the image control module 120, according to one embodiment of the present invention.

FIG. 3 is a high-level block diagram illustrating the functional modules within the image control module 120, according to one embodiment of the present invention. The image control module 120, in the embodiment illustrated in FIG. 3, includes an access module 302, an image-substitution module 304, a receiving module 306, a determination module 308, and an analysis module 310. Those of skill in the art will recognize that other embodiments can have different and/or additional modules than those shown in FIG. 3 and the other figures. Likewise, the functionalities can be distributed among the modules in a manner different than described herein. When describing the embodiments of the invention below, the examples frequently focus on security software settings as the primary type of password-protected information that is being accessed. However, throughout the specification, the examples used also apply to other types of information being accessed, as previously described.

The access module 302 provides a prompt to an entity 140 attempting to access a protected resource (e.g., something that can be password-protected or otherwise restricted from general, public use, such as an e-mail account, software security settings, a website, etc.). The prompt is adapted to enable providing of access to the protected resource upon receiving entry of a first password from a first graphic image. The access module 302 thus provides a password prompt to a user or computer program (or other type of entity) attempting to enter a restricted area or obtain restricted information. For example, the entity 140 may be attempting to access security settings for a particular piece of software (e.g., antivirus software) on a computer, and the entity 140 may wish to modify certain settings. As one example, a human user may be attempting to access the settings to change one or more settings according to the user's preferences. As another example, a computer program may be attempting to access the settings to disable the security software protecting the computer to make it easier for the computer program to initiate a malicious attack on the computer.

In some embodiments, the prompt includes a graphic image displaying a password. In some embodiments, the prompt further includes a field for entry of a password (e.g., a CAPTCHA test). For example, upon trying to enter the security settings page, the entity 140 can be presented with a prompt that includes a graphic image showing a sequence of characters that form a password. The sequence of characters can be distorted or presented on a noisy background (or presented in some other manner that is typically more difficult for a computer program to read and enter into a field than for a human user). If the user is a human user, the prompt can include a first graphic image that displays a sequence of characters or first password for entry (e.g., into the provided field). If the human user types in the sequence of characters displayed in this first graphic image, the user will be provided access to the restricted area or information.

The image-substitution module 304 provides a graphic image to the entity 140 attempting to respond to the prompt. The graphic image provided is either the first graphic image or a second graphic image that displays a second password. Thus, in some embodiments, the module 304 sometimes provides the first graphic image to the entity 140, but other times provides the second graphic image. In some embodiments, these images are provided to the module 304 by or accessed by the module 304 through a server 116. An entity 140 that receives the first graphic image can then input the first password in response to the prompt (e.g., type into a password field the sequence of characters or first password displayed in the first graphic image). An entity 140 that receives the second graphic image can similarly input the second password in response to the prompt (e.g., type into a password field the sequence of characters or second password displayed in the second graphic image). In some embodiments, only the first password will provide access to the protected resource. Thus, in these embodiments, the entity 140 provided with the second image will enter the second password (e.g., the incorrect password) into the field.

In some embodiments, the second image is displayed specifically to computer programs or bots attempting to access the restricted information, while human users are provided with the first image and can thus enter the correct, first password. In this manner, computer programs are singled out for receiving the incorrect password information. In some embodiments, the computer programs or bots are always shown the second image (or shown the second image most of the time). In some embodiments, the second image is only displayed to computer programs once in a while and the first image is displayed the rest of the time. Thus, only some computer programs will be provided with the second image, while others will be provided with the first image.

In some embodiments, the image-substitution module 304 substitutes the first image for the second image by modifying an interface that displays the first image to intercept the first image and replace it with the second graphic image for display to the entity 140. Computer programs attempting to respond to the password prompt (e.g., on a web form) typically obtain information about the prompt (e.g., the coordinates of particular information on the web form, the image displayed in association with the prompt, etc.) through a programmatic interface (e.g., GD132 BitBlt( ), GetPixel( ), and other graphics API's). The interface is used to take a snapshot of what is being displayed on the screen (e.g., the various data on the screen, fields, images, etc.) for use by the computer program in responding to the password prompt. If information about a page that includes a password prompt is obtained through such an interface, it is typically a computer program, and not a human user, obtaining the information.

As described above, in implementing the image-substitution methods (e.g., substituting the second image for the first image), the image-substitution module 304 can hook and/or modify the interface that typically provides the first image to the computer program to periodically substitute it with the second image. In other words, the interface that is used by the computer program to take a snapshot of a screen can be used by the image-substitution module 304 to take a snapshot from the pre-hooked function of what is actually being displayed on the screen and to modify it. Thus, when preparing to display a graphic image that a user would view on the screen, the module 304 hooks the interface that a program would use to read the screen and modifies the image and/or generates a different image for the program to see (e.g., including a different sequence of characters obfuscated in the image). In some embodiments, this second image is provided by or retrieved from a server 116. Since computer programs, and not humans, are typically the entities to use this interface to access the graphical image, it is likely that only computer programs will be shown this modified or different image. Human users typically will not see the second image and may not know that a second image was provided to entities using the interface to take a picture of the screen. If the incorrect second password shown in the modified/different image is entered in response to the password prompt, it was likely input by a program or a bot, rather than a human user. In some embodiments, the correct, first image is displayed on a computer screen while the incorrect, second image is displayed to the computer program requesting the image through the interface. In some embodiments, the first image is never displayed on a computer screen while the second image is provided to the computer program.

Which programs are provided with which image can be determined randomly, or can be planned according to a set formula or set criteria. For example, the image-substitution module 304 can be adapted to provide the second image to every $10^{th}$ (or $100^{th}$, or any other number) computer program or programmatic access attempt, while the rest receive the first image. As another example, the image-substitution module 304 can be adapted to provide the second image only to computer programs having particular characteristics (e.g., characteristics associated with malicious attackers), while the rest receive the first image. As another example, the module 304 can randomly provide the first and second images to computer programs or the module 304 can be designed to provide the second image a predetermined number of times (e.g., every 20 minutes, every hour, 5 times a day, etc.). It is also possible for the module 304 to cycle through different types of second images or to provide images displaying passwords that are decipherable by different types of attackers or attack methods to facilitate determining what version/type of malware is attacking. The module 304 can also be adapted to provide the second image only to entities accessing the image through an API, so the various examples above can be limited to this group of entities (which are more likely to be computer programs rather than human users).

Providing the second image only once in a while to an entity 140 trying to respond to the password prompt provides the benefit of allowing collection of samples and early warning information, without necessarily alerting attackers to the detection method. In some cases, attackers will try their attack methods to determine if they can get around the password protection methods and access the protected information. If the attacker cannot get through the password barrier quickly, then the attacker may want to stop use of his methods or switch attack techniques. For example, a malicious attacker will commonly test his attack methods against numerous major security software vendors' products to see if he can get around the protections in the current versions of these products. However, if the methods do not quickly work to get the attacker around the password protection for these products, the attacker may quickly release his attack to avoid being detected. If the second image is substituted for the first image 100% of the time for computer programs trying to access the protected resource, the attacker may quickly discover that his attack methods are not working. In this case, the attacker might then move to a different method of attack.

With the method described herein of substituting the first image for the second image only every once in a while, the attacker will sometimes be able to gain access to the protected resource. The attacker's methods will be successful in accessing the restricted information enough times that there is still some value in the attack from the attacker's point of view. The occasional image substitution method described above will not prevent all attacks, since the attacker will sometimes be given the first image with the correct password. However, this method can provide useful information when an attack is occurring. The occasional substitution method allows for the gathering of information about the attack methods and for providing an early warning of the attack. This information can be useful in studying the current attacker and attack methods, and can be helpful in preventing future attacks. Thus, the attacks are not necessarily immediately prevented (so the attacker is not discouraged from using his attack methods), but the attacker is inadvertently providing useful insight into his attack methods.

As described above, in some embodiments, the second image is shown every time or nearly every time a computer program attempts to access the first image (e.g., by calling an interface). In these embodiments, the method described herein is used as a prevention method rather then just a mechanism for gathering information about the attacker. In these embodiments, if the second password is received in response to the prompt, the entity 140 can be prevented from accessing the protected resource.

In some embodiments, the second image is a completely different image from the first image. In other embodiments, the second image is simply a modified version of the first image. For example, the second image may have the same structure and noisy background or letter distortions that the first image includes, however the second image may display a different word, phrase, sequence of characters, etc. (e.g., the second image displays the second password while the first image displays the first password). Thus, the first image could display the distorted password "cat," possibly on a noisy background, while the second image displays the distorted password "dog," possibly on the same noisy background.

In some embodiments, the second password displayed on the second image is designed to be reasonably different from the first password to avoid typing errors. For example, if the first password is "dog," the second password might not be "d0g" or another similar word. If the first and second passwords are too similar, it is possible that the computer program might be shown "d0g," but might occasionally enter the password incorrectly and may actually type in "dog" accidentally (thus entering the correct, first password rather than the incorrect, second password). Similarly, a human user could make a typing error and type in "d0g" instead of "dog." In some cases, the user or computer program may type in a wrong password, or a password that does not match either the first or second password (e.g., "dfg" or some other variation on the word "dog"). In this situation, access to the protected resource may be denied.

The second password can be selected in a number of manners. In some embodiments, it is a randomly selected sequence of characters. In other embodiments, specific criteria or formulas are used in the selection. For example, to avoid the similarity problem between the first and second passwords described above, the image-substitution module 304 can be adapted to select a second password that is quite different from the first. In some embodiments, the module 304 reserves certain passwords to be used for the second password and excludes their use and anything similar from the set of passwords used for the first password (or vice-versa). In some embodiments, the module 304 will not select a second password that has any (or a certain number of) letters/numbers in common with the first password, has letters/numbers that can be easily confused (e.g., a number of lower case "1's" in a row, or an "1" and a number one, or an "o" and a zero, etc.), or has any letters located near on the keyboard to letters/numbers in the first password (that might be easily substituted for each other in a typing error). These are but a few examples of how the passwords can be selected, but many other selection techniques can be used to help ensure that the passwords are sufficiently different.

In some embodiments, the functions for displaying a picture of the screen are only hooked when a password prompt including a graphic image is being displayed or when an image-substitution is to occur. In other embodiments, the functions are prehooked (e.g., a hook remains on the functions all the time and is used for image substitution periodically). Thus, in these embodiments, the hook is already in place before the module 304 substitutes the image and even when no substitution is occurring. In either of these embodiments, the module 304 can be designed to only interfere with the graphic password test functions when the second image is to be displayed. In this manner, the module 304 can minimize impact on the system by interfering as little as possible.

The receiving module 306 receives input of a password in response to the prompt. In some embodiments, the password is input into a field associated with the prompt. The password may have been typed into the field by a human user typing on a keyboard in response to a prompt displayed on the computer screen. However, it is also possible that a computer program may have input information into the field in response to the prompt. As explained above, the first graphic image will likely have been displayed to the human user and the user will input the first password displayed in the image on the screen. However, a computer program that calls an interface to take a picture of the screen is either provided with the first image or a second, different/modified image. The computer program may either input the first password or the second password (or a wrong or mistyped password that matches neither), depending on which image is displayed.

The determination module 308 determines whether the password received comprises the first password or the second password. In some embodiments, the module 308 reviews an entry in a password field. The module 308 can determine whether a sequence of characters entered into the password field matches the sequence of characters displayed in the first image or the second image. In some embodiments, the module 308 can also recognize when a wrong or mistyped password is entered, which matches neither the first nor the second password.

The analysis module 310 responds based on the results of the determination by the determination module 308. In some embodiments, if the entry matches the first password, then analysis module 310 responds by providing access to the protected resource. However, in some embodiments, if a second image was displayed (e.g., to an entity 140 accessing the image through a programmatic interface) and if the entry matches the second password, the module 310 responds by denying access (e.g., preventing an attacker from modifying settings in security software). Thus, the module 310 prevents access of an entity 140 that input the second password in response to the prompt. In some embodiments, the module 310 collects information about the entity 140 attempting to access the protected resource (e.g., security software settings). In addition, in some embodiments, the module 310 permits access to the protected resource even if the second password is entered, but the module 310 also collects information about the entity 140 attempting access. In some embodiments, the module 310 determines the identity of the program that attempted access and gathers information about the access methods used for analysis. The samples and early warning information gathered can be used for learning about attackers and for preventing future attacks (and learning about graphic password deciphering techniques used). The analysis module 310 can also respond in a number of other manners (e.g., when a second password is received, the module 310 can respond by sending out a warning or a notice to the server 116 and/or user or client computer 110, etc.)

In some embodiments, the analysis module 310 notes the processes calling the interfaces that have been hooked so that it is possible to determine which processes should be delivered as a sample. In these embodiments, the hooking infrastructure is designed so that when an attack is detected, infrastructure can also be used for identifying the program that is the source of the attack. In some embodiments, the module 310 can determine which program is generating the keyboard events in response to the prompt (e.g., which program input the second password into the password field). For example, the module 310 can correlate the time at which the keyboard events inputting the second password occurred and the time that a particular program was calling the programmatic interface to help identify which program input the second password. In other embodiments, the module 310 does not necessarily know which program generated the keyboard events, but knows information about and/or has a list of programs that intercepted the screen at the time the keyboard events occurred (e.g., at the time of the inputting of the second password shown in the second image).

Figure 4:
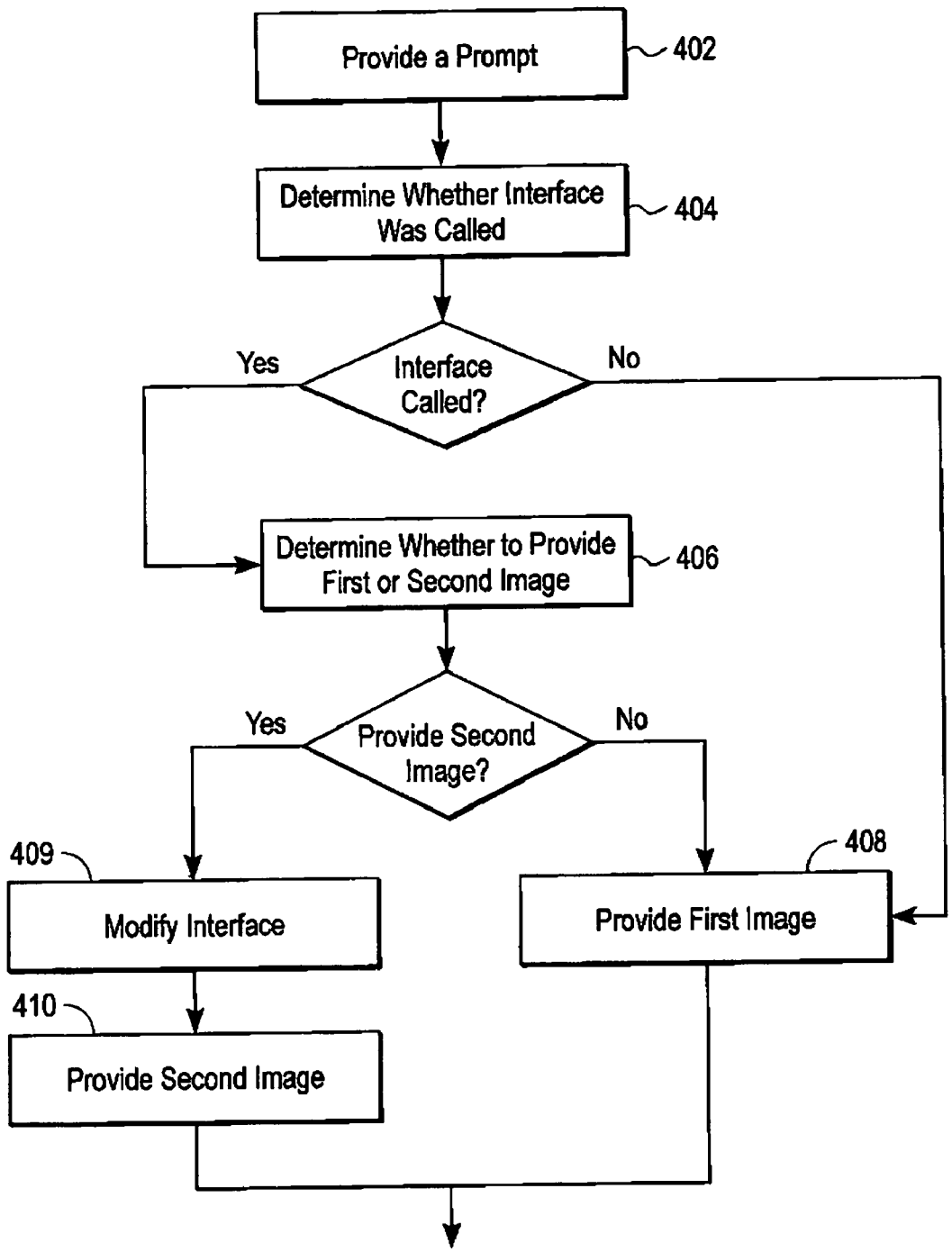
FIG. 4 is a flowchart illustrating steps performed to provide a prompt and provide an image to an entity, according to one embodiment of the present invention.

Referring now to FIG. 4, there is shown a flowchart illustrating the operation of the image control module 120, according to some embodiments of the present invention. It should be understood that these steps are illustrative only. Different embodiments of the image control module 120 may perform the illustrated steps in different orders, omit certain steps, and/or perform additional steps not shown in FIG. 4 (the same is true for FIG. 5).

As shown in FIG. 4, the image control module 120 provides 402 a prompt to an entity 140 attempting to access a protected resource. The prompt is adapted to provide access upon receiving entry of a first password from a first graphic image. As described above, the entity 140 can be a human user or a computer program attempting to access some restricted information. In some embodiments, the user or program can respond to the password prompt by typing in the password displayed in the graphic image.

In some embodiments, the image control module 120 determines 404 whether a programmatic interface or API was called to take a picture of or otherwise access what is being displayed on the computer screen. As described above, a human user can simply view information associated with the password prompt displayed on the screen and can respond to the prompt accordingly. However, a computer program trying to respond to the prompt commonly calls an interface (e.g., an API for image capture) to retrieve a picture of what is being displayed on the screen. In some embodiments, if an interface was not called to retrieve the image on the screen, the module 120 provides 408 the first image to the entity 140. In this case, it is more likely that the entity 140 is a human user rather than a computer program, since an interface was not called. In some embodiments, if an interface was called (e.g., the entity 140 is more likely a computer program), the module 120 determines 406 whether to provide the first image or the second image. As described above, the first image can be provided to a computer program requesting the image through an interface. However, the module 120 can periodically substitute a second image for the first image. In some embodiments, the second image is displayed only through the API, so the second image is generally received by a computer program accessing the image through the API (and would not typically be viewed by human users viewing an image on the screen).

As described above, whether to provide the first or second image can be determined in a number of ways (e.g., randomly, according to a predetermined formula, etc.). In some embodiments, the module 120 can even decide to always provide the second image when an interface is called to receive the image. If the image control module 120 determines that the second image should not be provided, the module 120 can respond by providing 408 the first image to the entity 140. In this case, the entity 140 may be a computer program, but the module 120 has determined that the program should receive the first image rather than the second image. In some embodiments, if the image control module 120 determines that the second image should be provided, the module 120 can respond by modifying 409 or hooking the interface that provides the image to the entity 140. Instead of providing the first image, the module 120 can provide 410 the second image to the entity 140 using the interface, in these embodiments. As explained previously, in some embodiments, the interface is pre-hooked (e.g., module 120 has a hook resting on the interface) and thus this modifying 409 or hooking step may occur at the beginning of the method or at some other point in the methods described herein.

Figure 5:
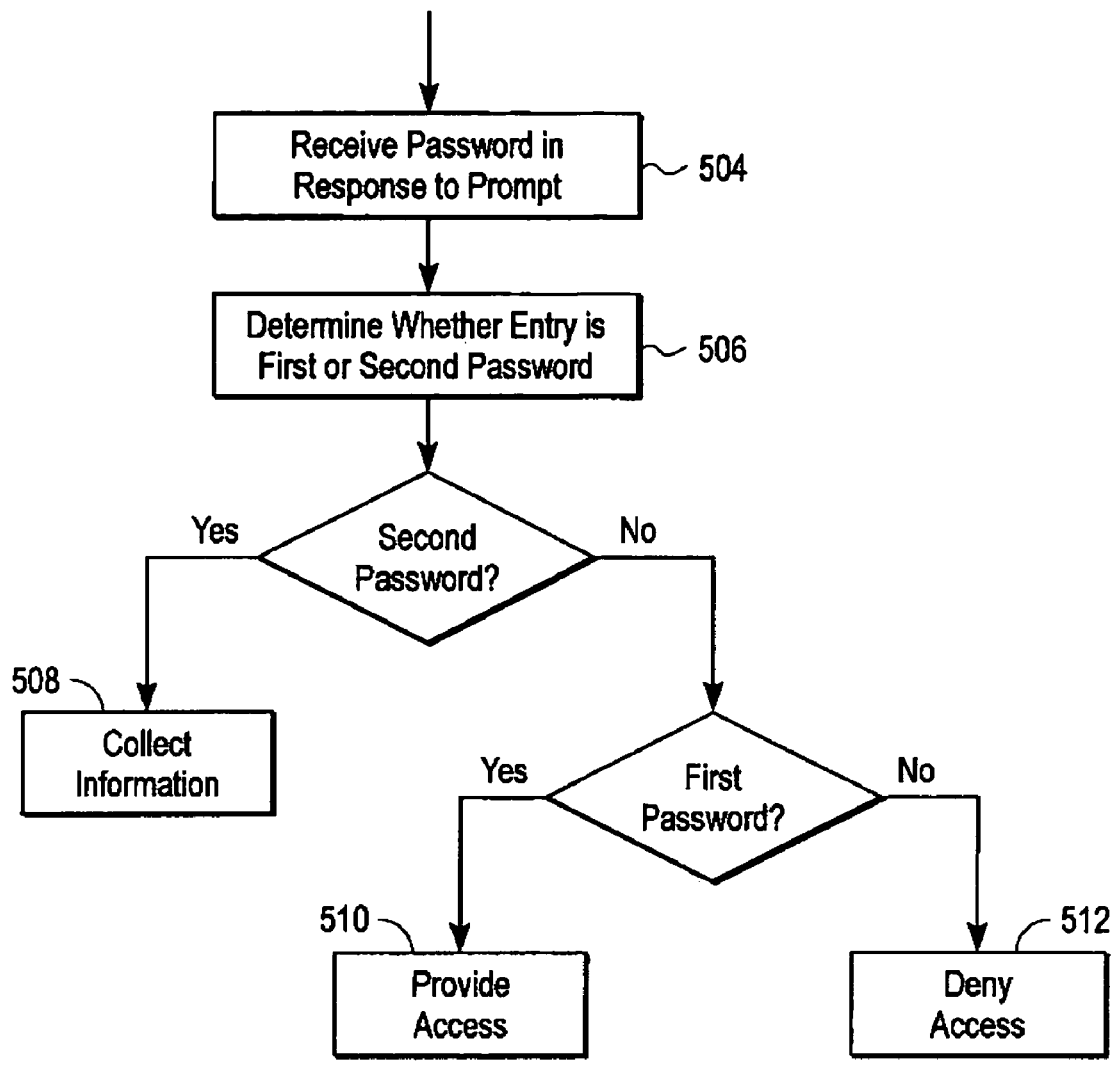
FIG. 5 is a flowchart illustrating steps performed to determine whether a first or second password was received and to respond based on the received password, according to one embodiment of the present invention.

Referring now to FIG. 5, there is shown a flowchart illustrating the operation of the image control module 120, according to some embodiments of the present invention. Specifically, FIG. 5 illustrates the steps of the image control module 120 involving determination of whether the first or second password was entered and response to the entry.

In some embodiments, after providing a first or second image to the entity 140, the image control module 120 receives 504 a password in response to the prompt. For example, a human user entity 140 might type in the password shown in the image, such as the first image, displayed on the computer screen. As another example, a computer program entity 140 might input the password shown in the image the computer program received (e.g., through a programmatic interface). The program might thus input either the first password shown in the first image or the second password shown in the second image, depending on what image was provided to the program.

In some embodiments, the image control module 120 determines 506 whether the password received is the first password or the second password. If the entry is the second password, the module 120 can collect 508, information about the entity 140 that entered the second password (e.g., samples including information about the entity 140, possible attack information and methods, early warning information, etc.). In some embodiments, the module 120 might deny access to the protected resource, while in other embodiments the module 120 might still grant access even though the second password was entered. If the entry is not the second password, the module can determine if the entry is the first password. If so, the module 120 can provide 510 access to the protected resource. In this scenario, the entity 140 may be a human user who typed in the correct password for access, or the entity 140 could also be a computer program (possibly attempting an attack). If the entry is not the first password (e.g., is not the first or second password), the module 120 can deny 512 access. In this scenario, the password does not match the password displayed in the first or second image. Thus, the entity 140 likely made a typing error or otherwise incorrectly entered in the password displayed in the image shown to that entity 140. In some embodiments, the entity 140 may attempt to retype in the password to try to gain access to the protected resource if access was not gained the first time.

In the manner described above, the image control module 120 provides a method for detecting and managing local graphic password deciphering attacks by computer programs attempting to circumvent a CAPTCHA or other image-based test. In detecting these attacks, the module 120 does not necessarily discourage the attackers from attempting these attacks since the module 120 can be designed to not necessarily prevent attackers (or at least all attackers) from gaining access to the password-protected information. Thus, the module 120 also provides a useful mechanism for continuing to monitor for and collect information about attackers and the types of attacks conducted as these attacks are occurring over time.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer program product having a computer-readable medium having computer program instructions recorded thereon for detecting a password deciphering attack, the computer program instructions comprising instructions for:
   providing a prompt to an entity attempting to access a protected resource, wherein the prompt is for providing access to the protected resource upon receiving entry of a first password contained in a first graphic image;
   providing a graphic image to the entity attempting to respond to the prompt, wherein the graphic image comprises a second graphic image that displays a second password, the graphic image provided by modifying an interface through which graphic images are accessed to replace the first graphic image with the second graphic image for display to the entity;
   receiving a password in response to the prompt;
   determining whether the password received comprises the first password or the second password; and
   responding based on the results of the determination.

2. The computer program product of claim 1, wherein one or more computer programs attempt to respond to the prompt by obtaining information about the prompt through the interface and wherein the second graphic image is provided to some of the one or more computer programs through the interface, while the first graphic image is provided to other of the one or more computer programs.

3. The computer program product of claim 1, wherein modifying the interface further comprises providing the second graphic image to the entity through a different access interface than the first graphic image.

4. The computer program product of claim 1, wherein one or both of the first and second graphic images is selected from a group consisting of: a sequence of characters displayed on noisy background and a distorted sequence of characters.

5. The computer program product of claim 1, wherein modifying the interface further comprises hooking the interface to intercept the first graphic image and replace it with the second graphic image for display to the entity.

6. The computer program product of claim 1, wherein responding based on the results of the determination further comprises performing an action selected from a group consisting of: preventing a computer program from accessing the protected resource in a response to a determination that the password comprises the second password and collecting information about a computer program attempting to access the protected resource in a response to a determination that the password comprises the second password.

7. The computer program product of claim 1, wherein the second password displayed by the second graphic image is substantially different from the first password displayed by the first graphic image, and wherein the second graphic image is substantially different from the first graphic image.

8. A computer-implemented method of detecting a password deciphering attack, the method comprising:
   providing a prompt to an entity attempting to access a protected resource, wherein the prompt is for providing access to the protected resource upon receiving entry of a first password contained in a first graphic image;
   providing a graphic image to the entity attempting to respond to the prompt, wherein the graphic image comprises a second graphic image that displays a second password, the graphic image provided by modifying an interface through which graphic images are accessed to replace the first graphic image with the second graphic image for display to the entity;
   receiving a password in response to the prompt;
   determining whether the password received comprises the first password or the second password; and
   responding based on the results of the determination.

9. The method of claim 8, wherein responding based on the results of the determination comprises collecting information about methods used by a computer program attempting to access the protected resource in a response to a determination that the password comprises the second password.

10. The method of claim 8, wherein one or both of the first and second graphic images is selected from a group consisting of: a sequence of characters displayed on noisy background and a distorted sequence of characters.

11. The method of claim 8, wherein the second password displayed by the second graphic image is substantially different from the first password displayed by the first graphic image, and the second graphic image is substantially different from the first graphic image, wherein the first graphic image is sometimes displayed to entities instead of the second graphic image.

12. The method of claim 8, wherein modifying the interface further comprises hooking the interface to intercept the first graphic image and replace it with the second graphic image for display to the entity.

13. The method of claim 8, wherein providing a prompt further comprises displaying the prompt to a user or a computer program attempting to access security settings on a computer.

14. A computer system for detecting a password deciphering attack, the system comprising:
   a computer-readable storage medium storing executable software modules comprising:
      an access module for providing a prompt to an entity attempting to access a protected resource, wherein the prompt is for providing access to the protected resource upon receiving entry of a first password contained in a first graphic image;
      an image-substitution module for providing a graphic image to the entity attempting to respond to the prompt, wherein the graphic image comprises a second graphic image that displays a second password, the graphic image provided by modifying an interface through which graphic images are accessed to replace the first graphic image with the second graphic image for display to the entity;

a receiving module for receiving a password in response to the prompt;

a determination module for determining whether the password received comprises the first password or the second password;

an analysis module for responding based on the results of the determination; and a processor configured to execute the software modules stored by the computer readable storage medium.

15. The system of claim 14, wherein the analysis module is further adapted for collecting information about a computer program attempting to access the protected resource in a response to a determination that the password comprises the second password.

16. The system of claim 14, wherein the analysis module is further adapted for preventing a computer program from accessing the protected resource in a response to a determination that the password comprises the second password.

17. The system of claim 14, wherein the image-substitution module is further adapted to hook the interface to intercept the first graphic image and replace it with the second graphic image for display to the entity.

18. The system of claim 14, wherein the second password displayed by the second graphic image is substantially different from the first password displayed by the first graphic image, and the second graphic image is substantially different from the first graphic image, wherein the first graphic image is sometimes displayed to entities instead of the second graphic image, and wherein one or both of the first and second graphic images comprise a CAPTCHA test.

19. A computer system for detecting a password deciphering attack, the system comprising:

a computer-readable storage medium storing executable computer instructions, the computer instructions comprising:

a means for providing a prompt to an entity attempting to access a protected resource, wherein the prompt is for providing access to the protected resource upon receiving entry of a first password displayed in a first graphic image;

a means for providing a graphic image to the entity attempting to respond to the prompt, wherein the graphic image comprises a second graphic image that displays a second password, the graphic image provided by modifying an interface through which graphic images are accessed to replace the first graphic image with the second graphic image for display to the entity;

a means for receiving a password in response to the prompt;

a means for determining whether the password received comprises the first password or the second password;

a means for responding based on the results of the determination; and a processor configured to execute the computer program instructions stored by the computer readable storage medium.

20. The system of claim 19, wherein the second password displayed by the second graphic image is substantially different from the first password displayed by the first graphic image, and the second graphic image is substantially different from the first graphic image, and wherein the first graphic image is sometimes displayed to entities instead of the second graphic image.

* * * * *